United States Patent [19]
Bhatt

[11] Patent Number: 4,689,188
[45] Date of Patent: Aug. 25, 1987

[54] METHOD OF PREPARING FIBER REINFORCED CERAMIC MATERIAL

[75] Inventor: Ramakrishna T. Bhatt, North Olmsted, Ohio

[73] Assignee: The United States of America as represented by the Administrator of the National Aeronautics and Space Administration, Washington, D.C.

[21] Appl. No.: 886,149

[22] Filed: Jul. 16, 1986

[51] Int. Cl.$^4$ .............................................. C04B 35/80
[52] U.S. Cl. ....................................... 264/60; 264/63; 264/332; 428/367
[58] Field of Search ............................ 264/60, 63, 332

[56] References Cited

U.S. PATENT DOCUMENTS

| | | | |
|---|---|---|---|
| 3,819,786 | 6/1974 | May | 264/63 |
| 3,926,656 | 10/1974 | Mangels | 106/272 |
| 4,004,937 | 11/1975 | Masaki | 106/54 |
| 4,158,687 | 6/1979 | Yajima et al. | 264/60 |
| 4,285,895 | 8/1981 | Mangels et al. | 264/65 |
| 4,465,650 | 8/1984 | Ohno | 264/60 |

*Primary Examiner*—James Derrington
*Attorney, Agent, or Firm*—Gene E. Shook; John R. Manning

[57] ABSTRACT

Alternate layers of mats of specially coated SiC fibers and silicon monotapes are hot pressed in two stages: In the first a die is heated to about 600° C. in a vacuum furnace and maintained at this temperature for about one-half hour to remove fugitive binder.

In the second stage the die temperature is raised to about 1000° C. and the layers are pressed at between 35 MPa and 138 MPa. The resulting preform is placed in a rector tube where a nitriding gas is flowed past the preform at 1100° C. to 1400° C. to nitride the same.

27 Claims, 4 Drawing Figures

# METHOD OF PREPARING FIBER REINFORCED CERAMIC MATERIAL

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is concerned with an improved fiber reinforced ceramic material. The invention is particularly directed to a reaction-bonded silicon nitride (RBSN) matrix material that is reinforced with fiber.

Because of their lightweight, excellent oxidation resistance, high-temperature strength, environmental stability, and nonstrategic nature, silicon-based ceramics are candidate materials for high performance advanced gas turbine and diesel engines. However, the use of these materials is severely limited because of their inherent flaw sensitivity and brittle behavior. The reinforcement of ceramics by high strength, high modulus, continuous length ceramic fibers should yield stronger and tougher materials. Glass matrix composites reinforced by polymer derived silicon carbide fibers have clearly demonstrated the feasibility of obtaining strong and tough materials. These newly developed composites, however, are presently limited in temperature capability by matrix properties, interfacial reactions, and by thermal instability of the fibers above about 1000° C.

A reaction-bonded silicon nitride (RBSN) material has been suggested for use in advanced heat engine applications. The RBSN material is lightweight, has ease of fabrication, and near net shape capability. However, the use of RBSN material for structural applications is limited because of the low strength of the material as well as its brittle behavior.

In the past preforms for SiC fiber reinforced RBSN composites were prepared by either slip casting or plasma spraying. In the slip casting method, a slurry comprising silicon powder, fugitive polymer binder, and a dispersing medium is poured into a mold provided with a cavity filled with ceramic fibers oriented in the desired directions. The mold is agitated ultrasonically to remove entrapped molecules between fibers and slurry and to distribute the fibers in the slurry. The slurry and the fibers are heated in an oven at a controlled rate to drive off fugitive polymer binders and the dispersing medium. The resulting preform is further densified by conventional ceramic processing methods, such as reaction bonding or sintered reaction bonding.

In the plasma spray method, composite preforms are prepared by spraying molten silicon onto an array of fibers. These preforms are further treated in a nitrogen atmosphere at an elevated temperature to convert the silicon to a silicon nitride matrix.

One of the problems encountered in using these prior art procedures is the lack of control over the distribution and alignment of the fibers in the composite. Also the lack of a suitable surface coating on the fibers caused a fiber/matrix reaction which resulted in poor composite strength and brittle behavior. The use of high temperature densification methods additionally produced in intrinsic weakening of the fibers.

It is, therefore, an object of the present invention to provide a strong and tough SiC/RBSN composite material for use at temperatures up to 1400° C.

Another object of the invention is to provide a method of making such a composite material by utilizing optimum processing variables and using a SiC fiber having a suitable surface coating.

BACKGROUND ART

Yajima et al U.S. Pat. No. 4,158,687 discloses composite materials that are reinforced with SiC fibers which are produced by imbedding the fibers in, or layering with, a powdery matrix ($Si_3N_4$), pressing, and sintering. Organosilicon binders may be used, but the matrix is not reaction bonded.

Reaction bonding is disclosed in U.S. Pat. Nos. 4,285,895 to Mangels et al and 3,819,786 to May. In the Mangels et al patent reaction bonded $Si_3N_4$ is densified by heating under nitrogen gas pressure in the presence of a densification aid which is an oxide of Mg, Y, Ce, or Zr. In the May patent silicon nitride articles are made from a dough-like mixture of Si and binder. The articles are heated in nitrogen after hot-milling and the removal of trichloroethylene from the binder at 130° C.

U.S. Pat. No. 3,926,656 to Mangels is concerned with a multiple mixture containing silicon powder. An injection molding composition of Si powder, paraffin wax, zinc stearate, and $Fe_2O_3$ is used to form molded parts which are nitrided to form $Si_3N_4$ articles.

U.S. Pat. No. 4,004,937 to Masaaki discloses the use of nickel oxide as a sintering aide for silicon nitride. The silicon nitride ceramic material contains at least one of MgO, ZnO, and NiO in addition to at least one of $Al_2O_3$, $Cr_2O_3$, $Y_2O_3$, $TiO_2$, and $SnO_2$. The mixed powders are formed into a green compact and sintered in an inert gas.

DISCLOSURE OF INVENTION

A SiC fiber reinforced reaction bonded silicon nitride matrix composite material (SiC/RBSN) is produced by hot pressing alternate layers of mats of specially coated SiC fibers and silicon monotapes. The resulting silicon carbide/silicon preforms are nitrided at elevated temperatures in $N_2$ or $N_2/H_2$ to form a composite material comprising SiC fibers and a reaction bonded silicon nitride matrix. This composite material may be used in advanced engines operating at temperatures above about 1200° C.

DESCRIPTION OF THE DRAWING

The details of the invention will be described in connection with the accompanying drawings in which.

BEST MODE FOR CARRYING OUT THE INVENTION

The fiber reinforced reaction bonded silicon nitride matrix material of the present invention utilizes a commercially available silicon powder having a high purity. To reduce particle size and promote reactivity during nitridation, the powder is milled for 7 to 24 hours in an attrition mill utilizing $Si_3N_4$ balls, a $Si_3N_4$ container, and a $Si_3N_4$ arm. A typical milling charge is 297 grams of silicon powder, 3 grams of nickel oxide (NiO), and 1000 grams of heptane solvent. The amount of the nitriding aid, NiO, ranges from one to seven percent by weight. While NiO is the preferred nitriding aid, it is contemplated that other materials, such as $Fe_3O_4$, MgO, and $Al_2O_3$, may be used for this purpose.

After this milling operation, the silicon powder is dried in an oven to evaporate the milling medium, which is heptane. The dried silicon powder is used for preparing silicon monotape.

The chemical analysis, average surface area, and particle size of the powder before and after attrition milling are shown in table 1. It is apparent from the table that after the attrition milling there is a significant increase in the oxygen and carbon contents and essentially no increase in the iron content. The surface area of the powder increased from about 1.6 $m^2/g$ to about 10 $m^2/g$ while the average particle size decreased from 6 $\mu m$ to 0.4 $\mu m$.

TABLE I

| Material | Oxygen wt % | Carbon wt % | Nitrogen wt % | Iron wt % | Surface Area, $m^2/g$ | Average Particle Size, $\mu m$ |
|---|---|---|---|---|---|---|
| As-Received Silicon Powder | 0.43 | 0.025 | 0.0004 | 0.60 | 1.644 | 6.0 |
| Attrition Milled Silicon Powder | 1.20 | 0.31 | 0.07 | 0.60 | 10.216 | 0.4 |

Silicon carbide fibers are produced by chemical vapor deposition (CVD) from methyltrichlorosilane onto a heated carbon monofilament which is drawn continuously through a conventional depositon reactor. Different surface coatings are deposited onto the silicon carbon fibers by introducing hydrocarbon gas or a mixture of hydrocarbon gas or silane vapor near the exit port of the reactor. An enlarged view of the fiber cross section is shown in FIG. 1.

The fiber consists essentially of a silicon carbide sheath 10 surrounding a pyrolytic graphite coated carbon core 12. The silicon carbide sheath 10 has an outer diameter of about 142 $\mu m$ while the graphite coated carbon core 12 has a diameter of about 37 $\mu m$. The silicon carbide sheath 10 is entirely comprised of columnar B-SiC grains growing in a radial direction with a preferred {111} orientation.

Figure 2:
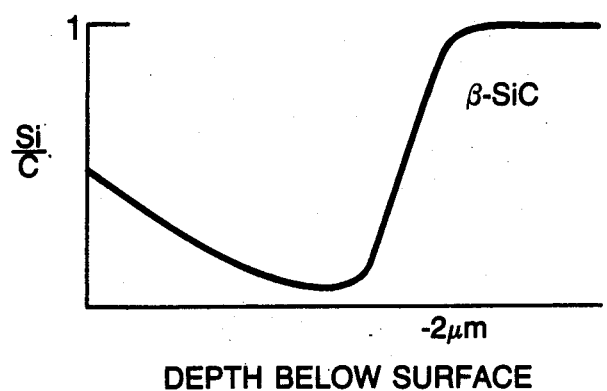
FIG. 2 is a graph showing the composition profile of the carbon rich coating on the surface of the silicon carbide fiber shown in FIG. 1.

The fiber has a surface coating 14 comprising an overlayer with a high silicon/carbon ratio on top of an amorphous carbon layer. The total thickness of the coating 14 is about 2 $\mu m$. The composition profile of the carbon rich coating 14 is shown in FIG. 2. The average room temperature tensile strength of the starting fiber is greater than 3.8 GPa.

Figure 1:
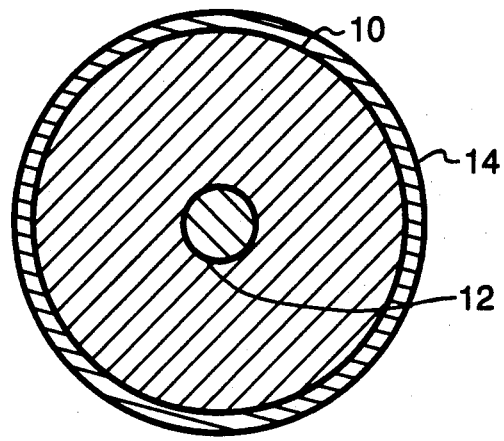
FIG. 1 is an enlarged cross section view of a chemical vapor deposited silicon carbide fiber utilized in the composite material of the present invention.

A silicon carbide fiber mat is prepared by winding the silicon carbide fiber shown in FIG. 1 on a metal drum at a predetermined spacing. The fiber is then coated with a polymer slurry by using a paint brush or a pressure spray gun. This polymer slurry comprises a low glass transition temperature polymer and a solvent. The fiber mat is dried and cut to the required dimensions.

The silicon carbide fiber reinforced reaction bonded silicon nitride matrix composite material of the present invention utilizes both the silicon carbide fiber mats and silicon monotapes. These silicon monotapes are produced by mixing the previously milled silicon powder, NiO, a fugitive polymer binder, such as a polybutylmethacralate or polytetrafluoroethylene known commercially as Teflon, and a standard solvent. This material is mixed in a blender for about 15 minutes, and the contents are filtered to remove excess solvent.

The resulting slurry is poured on a hot skillet to drive off the remaining solvent. The resulting polymer dough is rolled to a desired thickness to form the silicon monotape. This tape is then cut to a predetermined size.

Alternate layers of silicon carbide fiber mat and silicon monotape are stacked in an open channel molybdenum die. These alternate layers are then hot pressed in a vacuum furnace to form a green compact or preform. The silicon cloth and molybdenum die parts are separated by graphfoil to prevent any reaction between the preform and the die. As shown in Table II, two types of preforms were produced to illustrate the beneficial technical effects of the invention. One preform contained about 23 volume fraction of SiC fibers while the other contained about 40 volume percent. The volume fraction of fibers in each green compact was varied by controlling the fiber spacing or by adjusting the thickness of the silicon monotape.

TABLE II

| Property | 23 Vol % SiC/RBSN Composite | 40 Vol % SiC/RBSN Composite | Unreinforced RBSN |
|---|---|---|---|
| Density, gm/cc | 2.19 | 2.36 | 2.53 |
| Matrix Porosity | 0.4 | 0.4 | 0.2 |
| Elastic Modulus, GPa | 165 | 230 | 185 |
| 4-Point Bend Ultimate Strength, MPa | | | |
| As-fabricated | 727 | 868 | 262 |
| 1200° C. | 736 | — | 400 |
| 1400° C. | 592 | — | 345 |
| Tensile Ultimate Strength, MPa | | | |
| As-fabricated | 352 | 536 | — |
| Tensile Strain, % | | | |
| 1st Matrix Cracking | 0.13 | 0.13 | — |
| Ultimate Fracture | 0.25 | 0.3 | 0.14 |

These preforms are hot pressed in two stages. In the first stage the molybdenum die is heated to about 600° C. in a vacuum furnace at 2° C./min. This material is then maintained at this temperature about ½ hour to remove the fugitive binder present in the fiber mats and silicon monotapes. In the second stage the die temperature is raised to about 1000° C. and pressed at 35 MPa to 138 MPa for about 15 minutes to about one hour. The die is cooled to room temperature under vacuum conditions. The composite preform is then removed from the die. It is contemplated this hot pressing could be accomplished in another inert environment, such as nitrogen, instead of using a vacuum.

Figure 3:
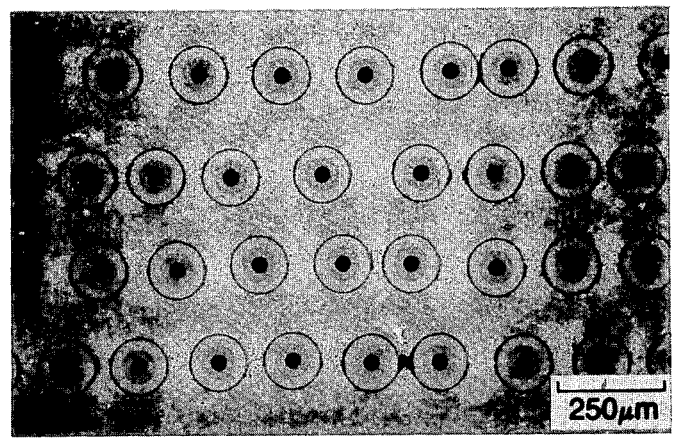
FIG. 3 is a photomicrograph showing a typical cross section of a SiC/RBSN composite material produced in accordance with the present invention showing the fiber distribution.

The composite preform is then transferred to a horizontal nitridation furnace comprising a recrystallized $Al_2O_3$ reaction tube having stainless steel end caps. A nitriding gas, $N_2$ or $N_2+4\%H_2$, having a commercial purity is flowed through the furnace before, during, and after nitridation. The nitridation is performed at about 1100° C. to 1400° C. for between 30 to 70 hours. A cross section of the resulting component material is shown in FIG. 3.

Physical and mechanical property data for unidirectionally reinforced SiC/RBSN composite materials fabricated in accordance with present invention and commercially available unreinforced RBSN matrix material at room and elevated temperatures are shown in Table II. Comparison of this data shows that the ultimate fracture strength and strains of the composites were significantly higher than those of unreinforced RBSN matrix material. Also, the composite strengths increased with the increase in fiber volume fraction.

Measurement of room temperature axial tensile strength for 30 volume percent silicon carbide/RBSN composite material after 100 hour exposure at 1200° C. and 1400° C. was 316 MPa and 323 MPa. These values are similar to the value 350 MPa measured for as-fabricated composites. This demonstrated the thermal stability of the composite material.

Figure 4:
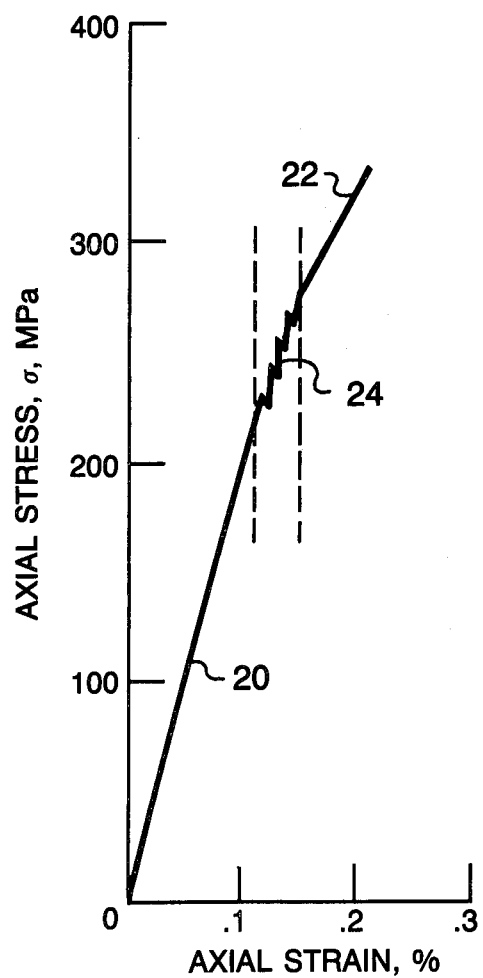
FIG. 4 is a graph showing the tensile stress-strain behavior for a 20 vol % SiC fiber/RBSN composite material at room temperature showing linear and nonlinear ranges.

When the SiC/RBSN composite material is stressed in tension in a direction parallel to the fiber, the composite extends elastically until the RBSN matrix fractures. At this stress level, in contrast with unreinforced RBSN, the composite retains its shape because of fiber bridging of the matrix cracks. The stress-strain behavior for a typical 20 vol % SiC/RBSN composite specimen tested in tension at room temperature is shown in FIG. 4. This test exhibited a first linear range 20 separated from a second linear range 22 by a non-linear range 24.

In addition, because of their high modulus, the SiC fibers bear more load than the matrix they replace. Thus, the composite stress at which the matrix fractures is greater than that for an unreinforced matrix. On further stressing the composite above the first matrix fracture, the material continues to deform with multiple matrix cracking until the ultimate fracture strength of the fiber is reached. Therefore, the composite is stronger than the unreinforced matrix, and it is tougher as manifestd by a high strain to failure and an ultimate non-catastrophic fracture which is fiber controlled. Because of the excellent thermal stability and creep resistance of the CVD SiC fiber, the composite deformation and fracture behavior is temperature independent to 1200° C.

While the preferred embodiment of the invention is disclosed and described it will be apparent that various modifications may be made to the composite material without departing from the spirit of the invention or the scope of the subjoined claims.

I claim:

1. A method of making a silicon carbide fiber-reinforced reaction-bonded silicon nitride composite material for use at elevated temperatures up to at least 1400° C. comprising the steps of
   forming a plurality of silicon carbide fibers,
   coating the surface of each of said fibers with an overlayer having a high silicon/carbon ratio on top of an amorphous carbon layer,
   forming mats of said silicon carbide fibers,
   preparing a plurality of silicon monotapes,
   stacking alternate layers of said mats and said monotapes,
   hot pressing said alternate layers in an inert environment to form a composite preform, and
   nitriding said composite preform.

2. A method of making a silicon carbide fiber-reinforced reaction-bonded silicon nitride composite material as claimed in claim 1 wherein the silicon carbide fibers are formed by chemical vapor depositing a silicon carbide sheath on a pyrolytic graphite carbon core.

3. A method of making a silicon carbide fiber-reinforced reaction-bonded silicon nitride composite material as claimed in claim 2 wherein the silicon carbide fibers are produced by chemical vapor deposition (CVD) from methyltrichlorosilane onto a carbon monofilament.

4. A method of making a silicon carbide fiber-reinforced reaction-bonded silicon nitride composite material as claimed in claim 3 wherein the carbon monofilament is heated and drawn continuously through a deposition reactor during chemical vapor deposition.

5. A method of making a silicon carbide fiber-reinforced reaction-bonded silicon nitride composite material as claimed in claim 4 wherein the pyrolytic graphite carbon core has a diameter of about 37 $\mu$m and the silicon carbide sheath has an outer diameter of about 142 $\mu$m.

6. A method of making a silicon carbide fiber-reinforced reaction-bonded silicon nitride composite material as claimed in claim 2 wherein the silicon carbide fibers are coated by exposing the surfaces thereof to a gas selected from a group consisting essentially of a hydrocarbon gas and a mixture of a hydrocarbon gas and a silane vapor.

7. A method of making a silicon carbide fiber-reinforced reaction-bonded silicon nitride composite material as claimed in claim 1 wherein the silicon carbide fiber mats are prepared by
   winding the coated silicon carbide fibers on a drum,
   coating said fibers on said drum with a polymer slurry,
   drying said fiber mat on said drum, and
   cutting said fiber mat to a predetermined size.

8. A method of making a silicon carbide fiber-reinforced reaction-bonded silicon nitride composite material as claimed in claim 1 wherein the silicon monotapes are prepared by
   blending milled silicon powder, a nitriding aid, a fugitive binder, and a solvent, to form a mixture,
   filtering said mixture to remove excess solvent thereby forming a slurry,
   drying said slurry to form a dough,
   rolling said dough to a predetermined thickness thereby forming said monotape.

9. A method of making a silicon carbide fiber-reinforced reaction-bonded silicon nitride composite material as claimed in claim 8 wherein the components are blended for about 15 minutes.

10. A method of making a silicon carbide fiber-reinforced reaction-bonded silicon nitride composite material as claimed in claim 8 wherein the nitriding aid is an oxide selected from the group consisting essentially of NiO, $Fe_3O_4$, MgO, and $Al_2O_3$.

11. A method of making a silicon carbide fiber-reinforced reaction-bonded silicon nitride composite material as claimed in claim 8 wherein the fugitive binder is a polymer.

12. A method of making a silicon carbide fiber-reinforced reaction-bonded silicon nitride composite material as claimed in claim 11 wherein the fugitive binder is a polymer selected from the group consisting essentially of polybutylmethacralate and polytetrafluoroethylene.

13. A method of making a silicon carbide fiber-reinforced reaction-bonded silicon nitride composite material as claimed in claim 8 wherein the slurry is dried by heating thereby driving off the remaining solvent.

14. A method of making a silicon carbide fiber-reinforced reaction-bonded silicon nitride composite material as claimed in claim 13 wherein the slurry is dried by pouring the same on a hot skillet to form a polymer dough.

15. A method of making a silicon carbide fiber-reinforced reaction-bonded silicon nitride composite material as claimed in claim 14 wherein the polymer dough is cut to a predetermined size after rolling.

16. A method of making a silicon carbide fiber-reinforced reaction-bonded silicon nitride composite material as claimed in claim 1 wherein said alternate layers of mat and monotape are hot pressed in a die in two stages.

17. A method of making a silicon carbide fiber-reinforced reaction-bonded silicon nitride composite material as claimed in claim 16 wherein said first hot pressing stage comprises
heating the die to about 600° C. for about ½ hour to remove the fugitive binder.

18. A method of making a silicon carbide fiber-reinforced reaction-bonded silicon nitride composite material as claimed in claim 16 wherein the second stage of said hot pressing comprises
heating the die to about 1000° C. for about 15 minutes to about one hour while pressing the same at a pressure between about 35 MPa and about 138 MPa.

19. A method of making a silicon carbide fiber-reinforced reaction-bonded silicon nitride composite material as claimed in claim 1 wherein the composite preform is nitrided by exposing the same to a nitriding gas selected from the group consisting essentially of nitrogen and a mixture of nitrogen and four percent hydrogen.

20. A method of making a silicon carbide fiber-reinforced reaction-bonded silicon nitride composite material as claimed in claim 19 wherein the nitriding is carried out at about 1100° C. to about 1400° C. from between about 30 hours and about 70 hours.

21. A method of making a silicon carbide fiber-reinforced reaction-bonded silicon nitride composite material comprising the steps of
chemically vapor depositing a silicon carbide sheath on a plurality of a pyrolitic graphite carbon cores thereby forming a plurality of silicon carbide fibers,
coating the surface of each of said carbide sheath with an overlayer having a high silicon/carbon ratio over an amorphous carbon layer,
forming a plurality of mats of said silicon carbide fibers,
preparing a plurality of silicon monotapes,
stacking alternate layers of said mats and said monotapes in a die,
hot pressing said stack of mats and monotapes to form a composite preform, and
nitriding said composite preform.

22. A method of making a silicon carbide fiber-reinforced reaction-bonded silicon nitride composite material as claimed in claim 21 wherein the silicon carbide fibers are coated by exposing the surfaces thereof to a gas selected from the group consisting essentially of a hydrocarbon gas and a mixture of hydrocarbon gas and silane vapors.

23. A method of making a silicon carbide fiber-reinforced reaction-bonded silicon nitride composite material as claimed in claim 21 wherein said stack of mats and monotapes are hot pressed in two stages.

24. A method of making a silicon carbide fiber-reinforced reaction-bonded silicon nitride composite material as claimed in claim 23 wherein the first stage comprises heating the die to about 600° C. for about ½ hour.

25. A method of making a silicon carbide fiber-reinforced reaction-bonded silicon nitride composite material as claimed in claim 23 wherein the second stage comprises heating the die to about 1000° C. for about 15 minutes to about one hour while pressing the same at a pressure between about 35 MPa and about 138 MPa.

26. A method of making a silicon carbide fiber-reinforced reaction-bonded silicon nitride composite material as claimed in claim 21 wherein the composite preform is nitrided by exposing the same to a nitriding gas selected from the group consisting essentially of nitrogen and a mixture of nitrogen and four percent hydrogen.

27. A method of making a silicon carbide fiber-reinforced reaction-bonded silicon nitride composite material as claimed in claim 26 wherein the nitriding is carried out at about 1100° C. to about 1400° C. for between about 30 hours and about 70 hours.

* * * * *